April 12, 1927.　　　J. G. BLAINE ET AL　　　1,624,090
STRETCHER
Filed March 1, 1926
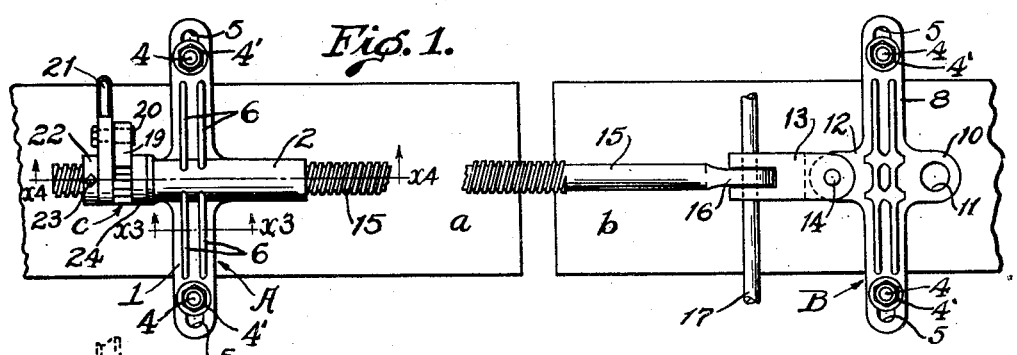
Fig. 1.
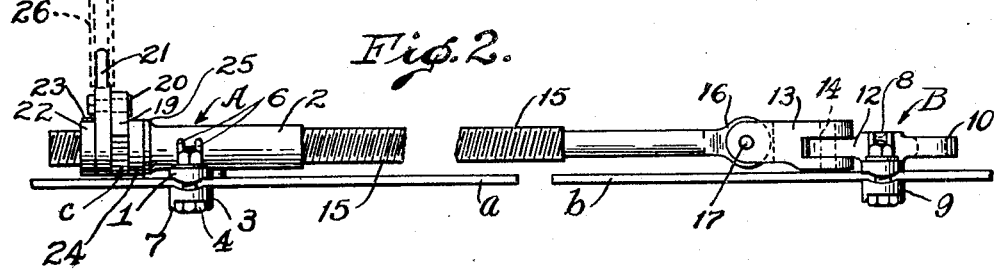
Fig. 2.
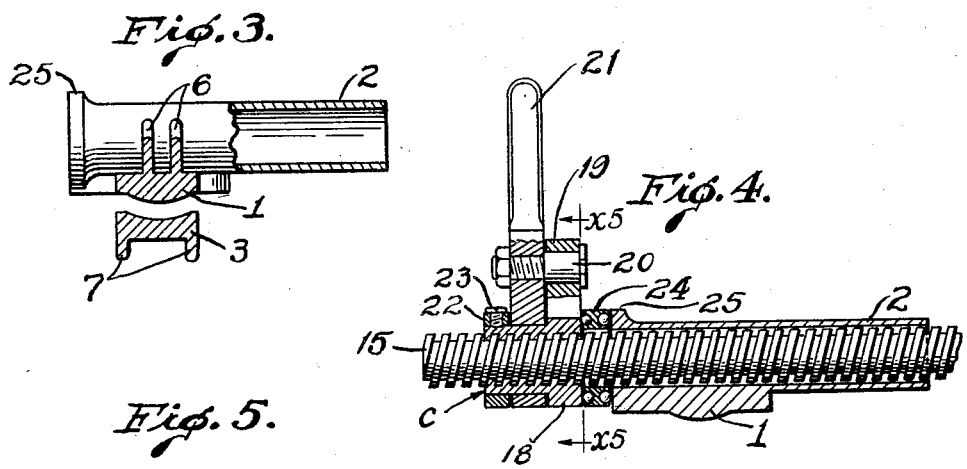
Fig. 3.
Fig. 4.
Fig. 5.
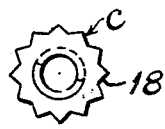
INVENTORS.
James G. Blaine.
Carl B. Patton.
BY Arthur T. Larrabee
their ATTORNEY.

Patented Apr. 12, 1927.

1,624,090

UNITED STATES PATENT OFFICE.

JAMES G. BLAINE, OF COMPTON, AND CARL B. PATTON, OF LOS ANGELES, CALIFORNIA.

STRETCHER.

Application filed March 1, 1926. Serial No. 91,390.

This invention relates more particularly to stretchers for pulling together the ends of a belt that is trained over a pulley or pulleys, and without removing the belt from the pulleys so that such ends may be laced or otherwise fastened together, so that the belt will be taut when the stretcher is removed.

The device may also be used for holding the ends of a belt in place while it is being shortened, lengthened, relaced, reclamped or repaired.

Workmen in the oil fields have found it necessary or preferable in some instances to lace belts while the same are trained over the pulley and in the case of the belt between the band wheel and the engine pulley it is practically necessary that the ends of such belt be fastened together while the belt is on the band wheel and engine pulley, and a device that can be successfully operated, preferably by one workman, and without likelihood of accidentally breaking while being used, is highly essential to reduce cost of labor and reduce to a minimum the danger to life and limb while operating such devices.

An object of the invention is to provide a novel belt stretcher that will satisfactorily accomplish all of the above purposes.

An object is to provide a novel belt stretcher that can be easily and quickly operated with a minimum amount of effort, and which may be easily moved from place to place by one workman.

Durability and adaptability for heavy duty work without likelihood of breaking while in use are other objects.

Other objects, advantages and features of invention may appear from the accompanying drawing, the subjoined detail description and the appended claims.

The accompanying drawing illustrates the invention in the form we at present deem preferable.

Figure 1 is a plan view of our stretcher attached to the ends of a belt, a fragment of which is shown.

Fig. 2 is a longitudinal edge elevation of the device shown in Fig. 1 with the wrench moved a quarter turn.

Fig. 3 is a section on line $x^3$, Fig. 1 showing detached from the belt a detail view of the screw tube and cooperating clamp. Part of the tube is broken to disclose interior construction.

Fig. 4 is a fragmental section on line $x^4$, Fig. 1 with the wrench in the position shown in Fig. 2 and the device detached from a belt.

Fig. 5 is a detail view of the ratchet nut as viewed from a plane indicated at $x^5$, Fig. 4.

The invention broadly comprises belt clamping members A and B that are adapted to be secured to the ends $a$, $b$ of a belt, a heavy duty screw member that passes through one clamp member and is detachably connected to the other clamp member, and means cooperating with said screw member to force the ends of the belt toward one another.

The clamp member A comprises a bar 1 having secured thereto an elongate screw tube 2. A bar 3 is adapted to cooperate with bar 1 and securely hold a belt in place when such bars are moved into clamping position by means of the nuts 4' and bolts 4 that extend through elongate slots 5 in the ends of the bars 1 and 3. Reinforcing ribs 6 on bar 1 tend to prevent springing of the bar 1 and reinforcing ribs 7 on bar 3 tend to prevent springing of the bar 3 and also provide means for preventing the heads of bolts 4 from turning during tightening of the nuts 4' on the bolts 4.

The clamp member B comprises bars 8 and 9 analogous to the bars 1 and 3. The bar 8 has a central extension 10 provided with an orifice 11 to provide means for attaching a line or rope to the device and also has an extension 12 that projects from the longitudinal center of bar 8 and to which a bifurcated link 13 is pivoted as at 14.

A heavy duty screw member 15 is nonrotatably mounted for free longitudinal movement in the smooth bore of tube 2 and is provided at one end with an eye member 16 that is pivoted to link 13 by means of a somewhat long pin 17 that is loose fitting in the link 13 and eye 16 to enable easy insertion of the pin as will be more fully hereinafter described.

Suitable means mounted on screw 15 are provided for drawing or forcing the clamp members toward each other and such means may comprise a ratchet nut $c$ that is threaded onto the screw 15 and is provided with a ratchet portion 18 adapted to be engaged by a ratchet dog 19 pivoted at 20 to a wrench or handle 21 that is rotatably mounted on the ratchet nut. A lock ring 22 fixed to nut c by a set screw 23 retains the wrench or handle in position. A thrust bearing 24 is mounted between the ratchet portion 18 and a flange or shoulder 25 formed on one end of tube 2 and tends to reduce to a minimum all friction between the nut c and the clamp shoulder 25 during operation of the device.

The screw tube 2 which is part of clamp A and through which the threaded end of screw 15 extends provides means for holding the clamp A and screw 15 in line so that an even bearing is obtained between the ratchet nut and clamp thereby preventing binding of the nut or tipping downward of the clamp member and consequent binding of the screw in the tube.

An advantage of this invention is that the clamps may be fastened to the belt ends without hindrance of other associated parts and then the two clamps may be joined together by the screw member 15 after which the device is ready for use.

In operation the clamp members A and B will be clamped to the ends of a belt in a manner as will be apparent from the foregoing to those skilled in the art. The eye 16 will then be secured to the link 13 by slipping the pin 17 through the orifices provided for that purpose and said orifices are of such size as to permit easy insertion of the pin. The screw 15 may then be drawn through the clamp A by a back and forward movement of the handle 21 which is preferably of such diameter as to allow a pipe 26 to be slipped over it to thereby increase its length if greater leverage is desired.

The long pin 17 provides a handle whereby the belt and device may be prevented from turning if necessary.

From the foregoing it is apparent that the clamp A through which screw 15 passes is used as a means of gripping one end of the belt so that when such screw, to which is attached the other end of the belt, is drawn through clamp A it will cause the ends of the belt to move toward one another.

After securing the ends of the belt together the dog 19 may be reversed so that operation of the handle 21 will move the nut in a reverse direction.

A further advantage gained by our construction is that by applying the power for forcing the clamp members together on the outside end of the tube secured to one of the clamp members we eliminate likelihood of bending the clamp member because the thrust of the ratchet nut will force the tube and clamp forward in a straight line and thereby we reduce to a minimum all friction between the operating parts and thus provide for easy and successful operation of the device.

By pivotally connecting the screw 15 to the clamp member B we provide means whereby our stretcher may be satisfactorily operated without likelihood of binding of the screw member 15 even though the clamp members are not secured at exactly right angles to the belt.

We claim—

1. A device of the character set forth comprising clamp members adapted to be secured to the ends of an article to be stretched; a tube fixed to one of said clamp members, said tube projecting beyond the side of the clamp member to which it is fixed and toward the other clamp member, said tube also having a smooth bore; a link pivotally connected to said other clamp member; a screw member detachably and pivotally connected at one end to said link, and having its threaded end extending through the smooth bore of said tube; and means threaded on said screw and being adapted to operate against said tube to force said clamp members toward each other for the purpose set forth.

2. A device of the character set forth comprising clamp members; a tube fixed to, and extending from the edge of one of said clamp members toward the other of said clamp members and having a smooth bore and a shoulder; a link pivotally connected to said other clamp member; a screw member having an eye and a threaded portion, the eye being quickly detachable and pivotally connected to said link and the threaded portion of said screw member extending through the smooth bore of said tube; a thrust bearing encircling said screw member and bearing against said shoulder; a ratchet nut threaded on said screw member and adapted for engagement with said thrust bearing and provided with a ratchet portion; a handle rotatably mounted on said ratchet nut; a ratchet dog pivoted to said handle and adapted for engagement with the ratchet portion of said nut; and means to retain said handle in position on said ratchet nut.

In testimony whereof, we have hereunto set our hands at Los Angeles, California, this 20th day of February, 1926, and this 23d day of February, 1926, respectively.

JAMES G. BLAINE.
CARL B. PATTON.